United States Patent [19]

Zupancic et al.

[11] Patent Number: 5,025,079
[45] Date of Patent: Jun. 18, 1991

[54] ORTHO-ORTHO ARAMATIC BIS MALEIMIDE-DIAMINE RESIN

[75] Inventors: Joseph J. Zupancic, Bensenville; Raymond J. Swedo, Mt. Prospect, both of Ill.; Donald R. Jamieson, Merriam, Kans.; Elaine F. Schumacher, Arlington Hts.; Allyson J. Buehler, Indiana Hd. Pk., both of Ill.

[73] Assignee: Allied-Signal Inc., Morris Township, Morris County, N.J.

[21] Appl. No.: 377,507

[22] Filed: Jul. 10, 1989

[51] Int. Cl.$^5$ ............................................. C08G 73/12

[52] U.S. Cl. ................................. 528/170; 428/473.5; 528/321; 528/322

[58] Field of Search ......................... 528/170, 321, 322

[56] References Cited

U.S. PATENT DOCUMENTS 4,465,520  8/1984  Adams et al. ....................... 526/262

Primary Examiner—Harold D. Anderson
Attorney, Agent, or Firm—Harold N. Wells; Gerhard H. Fuchs; Gerard P. Rooney

[57] ABSTRACT

APO-BMI is a chain-extended with certain diamines to provide thermosetting resins retaining the improved properties of APO-BMI resins, but having increased toughness in the cured resins.

4 Claims, No Drawings

ORTHO-ORTHO ARAMATIC BIS MALEIMIDE-DIAMINE RESIN

The Government has rights in this invention pursuant to Contract No. DE-AC04-76DP00613 awarded by U.S. Department of Energy.

BACKGROUND OF THE INVENTION

This invention relates to improving the properties of a unique bismaleimide resin which has been designated APO-BMI. This resin is disclosed and claimed in U.S. Pat. No. 4,464,520. It was directed to solving a difficulty relating to the processability of conventional bismaleimide resins which have a tendency to begin to polymerize only slightly above their melting temperature. Consequently, application of such resins has been difficult. The inventors of the '520 patent discovered that by reacting maleic anhydride with certain specific aromatic amines which were substituted in the ortho position they were able to create a unique family of bismaleimide resins which could be melted and held as a melt for an extended period without undergoing polymerization. The advantages of such compounds are obvious; however, they are still subject to disadvantages in that the resulting resins are rather brittle and, consequently, some improvement of such resins has been sought.

Functional chain extension of bismaleimides by Michael addition is well known as exemplified by the commercially available Kerimid 601 resin. However, such additions were not expected to be easily accomplished with the unique APO-BMI resins of the '520 patent since they are considered to be sterically hindered, thus decreasing the reactivity of the maleimide double bond. The present inventors have found that such materials may be chain extended by a reaction with certain diamines to produce significantly improved properties in the finished bismaleimide resins.

SUMMARY OF THE INVENTION

APO-BMI resins as defined in U.S. Pat. No. 4,464,520 are chain-extended with diamines to produce thermosetting resins which retain the improved properties of APO-BMI while having increased toughness.

The thermosetting resins may be defined as the product of (a) a bismaleimide having the formula:

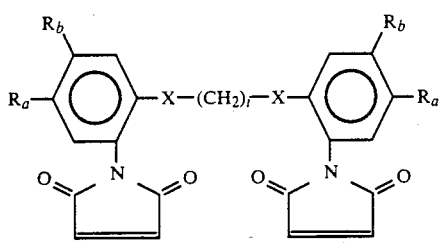

where
$R_a$ and $R_b$ are independently selected from hydrogen, an alkyl or alkoxy group containing up to 4 carbon atoms, chlorine, or bromine, or $R_a$ and $R_b$ together form a fused 6-membered hydrocarbon aromatic ring, with the proviso that $R_a$ and $R_b$ are not t-butyl or t-butoxy and where
X is O, S, or Se
i is 1–3
and the alkylene bridging group —$(CH_2)_i$— is optionally substituted by 1–3 methyl groups or by fluorine, with (b) a diamine.

DESCRIPTION OF THE PREFERRED EMBODIMENTS

APO-BMI

The bismaleimide (BMI) employed as one component of the resins of this invention are those described in U.S. Pat. No. 4,464,520 to J. E. Adams and D. R. Jamieson. It is unique in having an ortho-ortho configuration rather than the para-para configuration typical of bismaleimide resins. The BMI disclosed in the '520 patent is generally known as APO-BMI. The improved BMI has the formula:

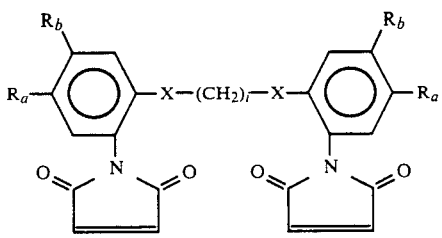

where
$R_a$ and $R_b$ are independently selected from hydrogen, an alkyl or alkoxy group containing up to 4 carbon atoms, chlorine, or bromine, or $R_a$ and $R_b$ together form a fused 6-membered hydrocarbon aromatic ring, with the proviso that $R_a$ and $R_b$ are not t-butyl or t-butoxy and where
X is O, S, or Se
i is 1–3
and the alkylene bridging group —$(CH_2)_i$— is optimally substituted by 1–3 methyl groups or by fluorine.

Particularly preferred species of the APO-BMI family are defined by $R_a$ and $R_b$ being either hydrogen or a methyl group and i=2. Examples of preferred compounds include 1,2-bis(2-maleimidophenylthio)ethane, 1,1-bis(2-maleimidophenyl(thio)methane, 1,3-bis(2-maleimidophenylthio)propane, and 1,2-bis(2-maleimido-4-chlorophenylthio)ethane.

Diamines

The APO-BMI family has been found to be chain-extendable with diamines despite its more sterically hindered ortho-ortho configuration. Further, in its chain-extended form APO-BMI's retain the advantages of those resins while having improved toughness.

Generally, aromatic diamines are suitable for chain-extending APO-BMI's, with specific diamines being selected to maintain processability and reduce brittleness. Non-limiting examples of suitable diamines include m-phenylenediamine, p-phenylenediamine, 2,6-diaminotoluene, p,p'-diaminodiphenyl sulfone, p,p'-diaminodiphenyl ether, 2,2-bis(4-aminophenyl)-propane, 2,2-bis(4-aminophenyl)-hexafluoroisopropylidine, N,N'-di(sec-butyl)-4,4'-methylene dianiline, N,N'-di(sec-butyl)-1,4-phenylenediamine, 1,2-bis(2-aminophenylthio)ethane (Cyanacure®) and piperazine.

While there appears to be no theoretical limit to the weight ratio of APO-BMI to diamine, practically the weight ratio will be in the range of from about 20:1 to 1:1, preferably about 10:1 to 1.1:1.

Processing

The selected diamine(s) will be combined with the selected APO-BMI(s) and heated under an inert atmosphere to a temperature in the range of about 125° to 150° C. and held for a period of time sufficient to complete the chain-extending reaction, say about 10 to 20 minutes.

When used to produce molded shapes, the chain-extended resin will be melted and held under an inert atmosphere at temperatures up to about 245° C. for a period of time sufficient to completely cure the resin, say about 1 to 6 hours.

Laminates may be prepared from the chain-extended resins by dissolving them in a suitable solvent, such as dimethyl formamide (DMF), and applying the resin solution to the reinforcing fibers, such as E-glass cloth. The solvent would then be removed by evaporation at an elevated temperature up to about 175° C., followed by heating (175° to 245° C.) and pressing (500 to 35,000 kPa) until the laminate is cured, according to procedures familiar to those skilled in the art.

EXAMPLE 1

A 2-liter resin kettle was fitted with a reflux condenser, a mechanical stirrer with stainless steel shaft and blade, a $N_2$ inlet, a drying tube, a thermocouple, and a heating mantle. The kettle was charged with 91.42 g of 4,4'-methylenedianiline (MDA). While stirring under a flow of $N_2$, the MDA was heated to melting ($\sim$125° C.). When the MDA was completely melted, 322.50 g of 1,2-bis(2-maleimidophenylthio)ethane (APO-BMI) (APO-BMI/MDA ratio=3.5) were quickly added to the kettle, and the temperature of the reaction mixture was quickly raised to 140°-150° C. while maintaining efficient stirring. After a reaction time of 18 minutes, the clear homogeneous reaction melt was poured into an enameled steel tray, and allowed to cool and solidify. Yield of resin was >95%.

Using this same procedure, reagent proportions were varied to produce APO-BMI/MDA weight ratios of 5.0, 6.7, 7.0 and 8.0. In the same manner, APO-BMI was chain-extended with Cyanacure ® (CY) at APO-BMI/-CY=6.7.

In the examples below resins were cured and then their physical and electrical properties determined. Both DSC (differential scanning calorimeter), and TGA (thermal gravimetric analysis), analyses were performed using a DuPont Model 9900 Thermal Analysis system. DSC analyses of uncured resins were conducted at $\Delta T=5°$ C./min. under $N_2$, while cured resins were analyzed at $\Delta T=10°$ C./min. under $N_2$. TGA analyses were conducted at $\Delta T=10°$ C./min. in air.

Coefficients of thermal expansion were determined using a Mettler TA-3000 TMA system.

Dielectric constants and loss factors were determined using a Gen Rad Digibridge system equipped with parallel plate electrodes at 1 MHz, 23° C., and 0% R.H.

EXAMPLE 2

Mold cures of amine chain-extended APO-BMI resins prepared according to Example 1 were conducted using a 3"×5"×1/16" flat sheet stainless steel mold. The mold and cover were coated with a Teflon mold release, then heated to 160° C. in a vacuum oven. Predried amine chain-extended APO-BMI resin was then placed in the mold, and allowed to melt under $N_2$. Additional resin was added, if necessary, to fill the mold. Once melted, the resin was degassed under vacuum at 160°-175° C. Degassing was continued until a quiet, bubble-free melt was obtained, and generally was complete in 15 to 30 minutes. Vacuum was then released and was replaced by a $N_2$ purge. The mold was covered, and the resin was cured at 175° C. for 24 hours, and then at 230° to 240° C. for 24 hours. The sample was allowed to cool to room temperature slowly after curing was completed.

EXAMPLE 3

Amine chain-extended APO-BMI resins prepared according to Example 1 were dissolved in DMF as 50 wt. % solids solutions and then applied to E-glass cloth. The treated cloth was heated at 177° C. in air to remove DMF. Multi-ply laminates were prepared by pressing at 177° C. and 3447 kPa gauge for several hours, followed by free-standing post-bake at 218° C. for 24 hours.

EXAMPLE 4

Chain extended resins were prepared following the procedures of Example 1 and compared with conventional bismaleimide, with and without amine chain extension. DSC analyses are reported in the table below.

TABLE A

| Bismaleimide | Amine | Bismaleimide/Amine Wt. Ratio | $T_m$, °C. Onset | $\Delta H$ polym.[a] Onset, °C. | Peak, °C. | Joules/gram (total) |
|---|---|---|---|---|---|---|
| BMI[b] | — | — | 135 | 160 | 195 | 138 |
| BMI | MDA[c] | 6.7[d] | 70 | 155 | 215 | 73 |
| APO-BMI[f] | — | — | 103 | 222 | 287 | 203 |
| APO-BMI | MDA | 3.5 | 58 | 145 | 250 | 104 |
| APO-BMI | MDA | 5.0 | 55 | 160 | 250 | 90 |
| APO-BMI | MDA | 6.7 | 50 | 175 | 250 | 180 |
| APO-BMI | MDA | 7.0 | 55 | 168 | 250 | 217 |
| APO-BMI | MDA | 8.0 | 50 | 185 | 250 | 204 |
| APO-BMI | Cy[e] | 6.7 | 107 | 209 | 265 | 209 |

[a]Determined using a DuPont 9900 Thermal Analysis System
[b]1,1'-(methylene-4,1-phenylene)-bismaleimide
[c]4,4'-methylenedianiline
[d]Commercial Kerimid 601 (Rhone-Poulenc)
[e]Cyanacure ® (American Cyanamid)
[f]1,2-bis(2-maleimidophenylthio)ethane It will be seen that the chain-extended APO-BMI's retain the large difference between the melting temperature ($T_m$) and the temperature at which polymerization begins (Onset) characteristic of APO-BMI's without such chain-extension.

EXAMPLE 5

The chain-extended APO-BMI's of the invention were prepared as in Example 1 and compared with conventional BMI, with and without chain extension. The difference in temperature between the melting point and the onset of polymerization was measured using a DuPont 9900 Thermal Analysis System. The results are given in the table below, along with a measurement of gel time at 350° F. in a 50 wt. % solution of DMF.

TABLE B

| Resin | Processing Window, °C.[a] | Gel Time at 350° F.[b] |
| --- | --- | --- |
| BMI[c] | 25 | 38 minutes |
| BMI/MDA[d] (6.7)[e] | 85 | 18 minutes |
| APO-BMI[g] | 119 | >4 hours |
| APO-BMI/MDA (6.7) | 120 | >4 hours |
| APO-BMI/CY[f] (6.7) | 102 | >90 minutes |

[a]Defined as ΔT between melting onset and polymerization onset as determined by DSC using a DuPont 9900 Thermal Analysis System.
[b]Determined using ~50 wt. % solids solutions in DMF.
[c]1,1'-(methylene-4,1-phenylene)-bismaleimide.
[d]4,4'-methylenedianiline.
[e]Commercial Kerimid 601 (Rhone-Poulenc).
[f]Cyanacure ® (American Cyanamid).
[g]1,2-bis(2-maleimidophenylthio) ethane It will be seen that the chain-extended BMI's have a wide "window" between the melting point and the onset of polymerization and gel at a much slower rate than a conventional BMI and its chain-extended counterpart.

EXAMPLE 6

Chain-extended APO-BMI and conventional BMI, with and without chain extension, were cured by heating at 175° C. under N₂ for 24 hours, followed by heating at 240° C. under N₂ for 24 hours. The properties of the cured resins as measured on the DuPont 9900 Thermal Analysis System are given in the table below.

TABLE C

| Resin | Tg, °C.[a] | TGA in Air[a] 5% Wt. Loss | 10% Wt. Loss |
| --- | --- | --- | --- |
| BMI[b]/MDA[c] (6.7)[d] | >300 | 400 | 410 |
| APO-BMI[f] | >300 | 385 | 390 |
| APO-BMI/MDA (3.5) | 210 | — | — |
| APO-BMI/MDA (5.0) | 247 | — | — |
| APO-BMI/MDA (6.7) | 275 | 370 | 375 |
| APO-BMI/MDA (8.0) | 283 | — | — |
| APO-BMI/CY[e] (6.7) | >300 | 373 | 375 |

[a]Determined using a DuPont 9900 Thermal Analysis system.
[b]1,1'-(methylene-4,1-phenylene)-bismaleimide.
[c]4,4'-methylenedianiline.
[d]Commerical Kerimid 601 (Rhone-Poulenc).
[e]Cyanacure ® (American Cyanamid).
[f]1,2-bis(2-maleimidophenylthio)ethane

EXAMPLE 7

The cured resins of Example 6 were compared for their physical and electrical properties by a Gen Rad Digibridge system with parallel plates and by the Mettler TA-3000 TMA system, with the results reported in the following table.

TABLE D

| Resin | Dielectric Properties ε'/tan δ[a] | Coefficient of Thermal Expansion α₂₆₀, ppm/°C.[b] |
| --- | --- | --- |
| BMI[c]/MDA[d] (6.7)[e] | 3.88/0.004 | 78 ± 2 |
| APO-BMI[f] | 3.28/0.005 | 67 ± 3 |
| APO-BMI/MDA (6.7) | 3.31/0.003 | 61 ± 5 |

[a]Determined using a Gen Rad Digibridge and parallel plate electrodes at 1 MHz, 23° C., 0% R.H.
[b]Determined using a Mettler TA-3000 TMA system.
[c]1,1'-(Methylene-4,1-phenylene)-bismaleimide.
[d]4,4'-Methylenedianiline.
[e]Commercial Kerimid 601 (Rhone-Poulenc).
[f]1,2-bis(2-maleimidophenylthio)ethane

We claim:
1. A thermosetting resin reaction product of (a) a bismaleimide having the formula:

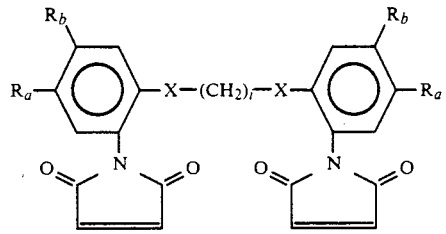

where
- $R_a$ and $R_b$ are independently selected from hydrogen, an alkyl or alkoxy group containing up to 4 carbon atoms, chlorine, or bromine, or $R_a$ and $R_b$ together form a fused 6-membered hydrocarbon aromatic ring, with the proviso that $R_a$ and $R_b$ are other than t-butyl or t-butoxy and where
- X is O, S, or Se
- i is 1-3 and the alkylene bridging group —(CH₂)ᵢ— is optionally substituted by 1-3 methyl groups or by fluorine, with (b) a diamine.

2. The resin of claim 1 wherein said diamine at least one member of the group consisting of m-phenylenediamine, p-phenylenediamine, 2,6-diaminotoluene, p,p'-diaminodiphenyl sulfone, p,p'-diaminodiphenyl ether, 2,2-bis(4-aminophenyl)propane, 2,2-bis(4-aminophenyl)-hexafluoroisopropylidine, N,N'-di(sec-butyl)-4,4'-methylene dianiline, N,N'-di(sec-butyl)-1,4-phenylenediamine, 1,2-bis(2-aminophenylthio)ethane and piperazine.

3. The resin of claim 1 wherein the weight ratio of said bismaleimide to said diamine is about 20:1 to 1:1.

4. The resin of claim 1 wherein the bismaleimide is 1,2-bis(2-maleimidophenylthio)ethane.

* * * * *